Nov. 22, 1949 W. C. ANTHONY 2,488,699
ELEVATING SHOVEL
Filed March 27, 1947 7 Sheets-Sheet 1

Inventor
William C. Anthony
by Parker & Carter
Attorneys.

Nov. 22, 1949   W. C. ANTHONY   2,488,699
ELEVATING SHOVEL

Filed March 27, 1947   7 Sheets-Sheet 3

Inventor
William C. Anthony
by Parker + Carter
Attorneys

Nov. 22, 1949     W. C. ANTHONY     2,488,699
ELEVATING SHOVEL

Filed March 27, 1947     7 Sheets-Sheet 4

Inventor
William C. Anthony
by Parker & Carter
Attorneys

Nov. 22, 1949 W. C. ANTHONY 2,488,699
ELEVATING SHOVEL
Filed March 27, 1947 7 Sheets-Sheet 5

Inventor
William C. Anthony
by Parker + Carter
Attorneys

Nov. 22, 1949      W. C. ANTHONY      2,488,699
ELEVATING SHOVEL

Filed March 27, 1947      7 Sheets-Sheet 6

Inventor
William C. Anthony
by Parker & Carter
Attorneys

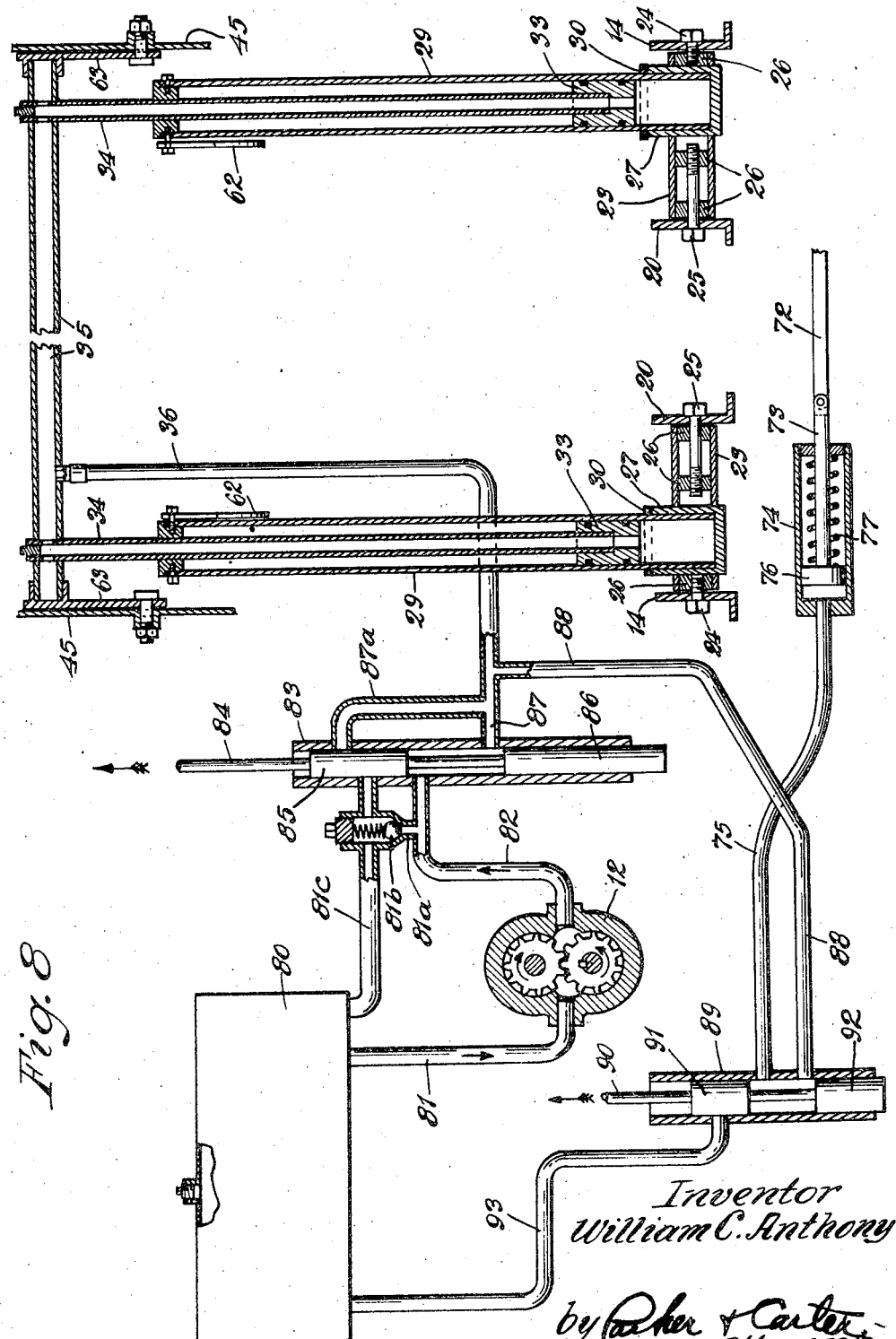

Patented Nov. 22, 1949

2,488,699

UNITED STATES PATENT OFFICE 2,488,699

ELEVATING SHOVEL

William C. Anthony, Streator, Ill., assignor to Anthony Company, Streator, Ill., a corporation of Illinois Application March 27, 1947, Serial No. 737,516

8 Claims. (Cl. 214—140)

This invention relates to a shovel and elevating and dumping device. It has for one object to provide a shovel assembly which may be mounted on an automotive vehicle, and particularly a "crawler type tractor," without alteration or change in the vehicle itself.

Another object is to provide an elevating shovel which may be mounted on a tractor by engagement with members of the tractor assembly proper without a change in the tractor construction.

An important object of this invention is to provide a shovel and means for supporting it, so arranged that when in digging position the shovel is as close as physically possible to the forward end of the tractor. Thus, the balance of the total structure is preserved without the necessity of counterweights or other equivalent members, and the device can be readily removed and replaced.

Another object is to provide a shovel which may be used for digging or collecting material and may then be manipulated to raise the shovel containing the material so that the filled shovel may be moved from place to place by movement of the tractor and so that it may thereafter be dumped.

Another object is to provide, in connection with an elevating shovel, means whereby the shovel may be raised about a plurality of points to secure a maximum lift.

Another object is to provide, in connection with a shovel supporting means, a plurality of fulcrums operating successively by means of which the shovel is given a greater lift than that which would be possible with a single fulcrum.

Another object is to provide a hydraulic control for an elevating shovel of the type indicated by means of which the raising mechanism and the shovel tipping mechanism can be readily operated from a single assembly.

Other objects will appear from time to time throughout the specification and claims.

This invention is illustrated more or less diagrammatically in the accompanying drawings, wherein:

Figure 8 is a schematic diagram showing a suitable hydraulic circuit for operating the device.

Like parts are indicated by like characters throughout the specification and the drawings.

As shown, the shovel is mounted on a tractor of standard construction. In general, such tractors include tracks 1 carried at one end on sprockets 2 and at the other end on wheels 3. Frame or chassis members 4 are provided to support the wheels and sprockets and driving mechanism or gearing. They are not shown in detail, as they form no essential part of the invention.

Figure 4:
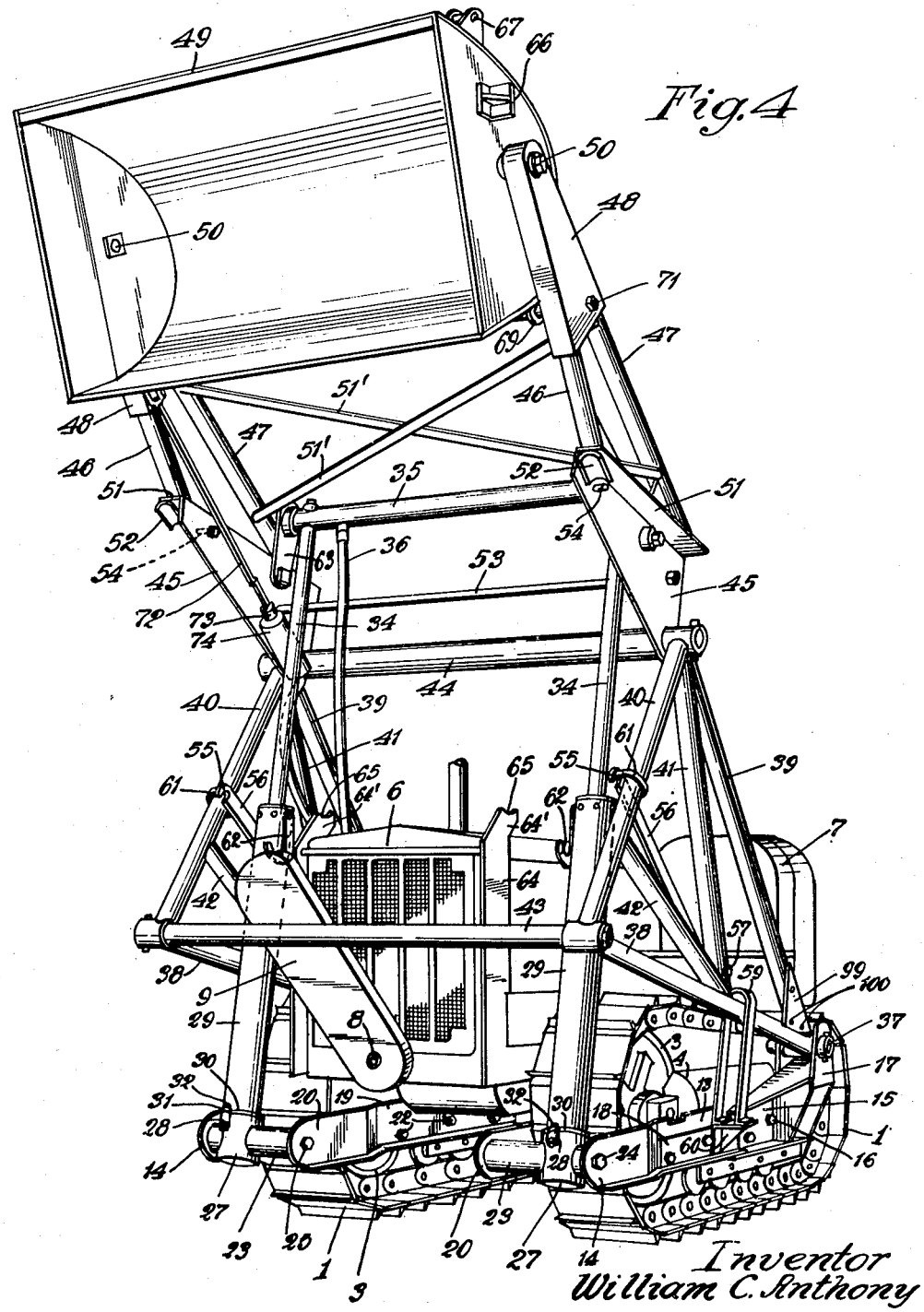
Figure 4 is a front perspective showing the shovel raised and tipped.

The tractor includes an engine indicated diagrammatically at 5, a radiator 6, a seat 7 and other necessary parts. A power take-off is ordinarily a part of the tractor. The power take-off is shown in Figure 4 and includes a driven shaft 8. A chain belt or other transmission is connected to this member and may be enclosed in a housing 9, which as shown in Figure 4 in particular, is positioned in front of the radiator. A shaft 10 is driven from the transmission enclosed in the member 9 and preferably by means of a universal joint 11 is connected to a pump 12. The invention is not limited to this particular arrangement of details but will include some form of power take-off by means of which a pump may be driven to furnish pressure fluid.

The shovel structure will now be described. As shown generally throughout the figures, a subframe for carrying the shovel parts is mounted on the tractor frame members 4. This subframe is shown in sectional detail in Figure 6. The frame may include portions 13 which are bent apart, as at 14. A rearward member 15 is joined to the member 13 by bolts 16, or otherwise, and carries an upwardly extending bearing member 17. A stiffening and reinforcing plate 18 may be added, if desired. An inside supporting member 19 is provided and is outwardly flared or bent, as at 20. The inside and outside plates just described are secured to the frame members 4 of the tractor by the bolts 16 and 22, or otherwise.

Figure 6:
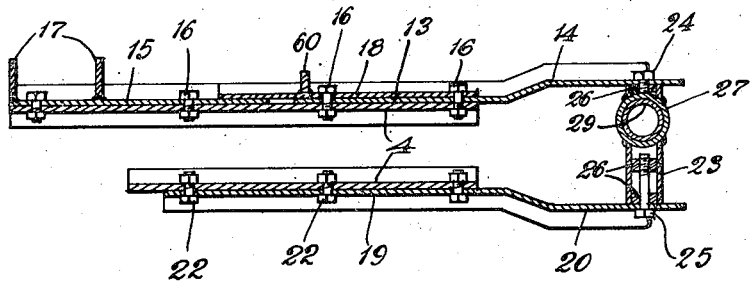
Figure 6 is a section showing the shovel frame, taken at line 6—6 of Figure 3.

It will be seen from Figure 6 that the shovel assembly includes built up carrying frame members which are mounted in pairs so that one pair is mounted on each of the tractor frame members 4.

Between each pair of shovel frame members 14 and 20 is mounted a tubular member 23. These members are held in place by screws or bolts 24, 25 which engage glands or fillers 26, 26 mounted within the tubular members 23. Rings or cup-like members 27 are mounted one in each of the tubular members 23. As shown particularly in Figure 4, the members 27 include sockets 28 which are threaded to receive screws. Cylinders 29 are mounted one in each of the members 27. These cylinders 29 are provided with collars 30 which are shaped with ears 31 to receive bolts 32 so that the collars may be bolted to the socket members 28, and the cylinders may thus be held in place within the members 27.

Pistons 33 are mounted within the cylinders 29 and are provided with piston rods 34 which are hollow. These rods are connected by a tubular member 35. A flexible conduit 36 carries operating fluid from the pump to and from the member 35. The piston rods 34, being hollow, conduct the pressure fluid downwardly to a point below the pistons 33.

Triangular frame members are pivoted one on each side of the assembly at 37 on the bearing supporting members 17. As shown, the frame members include a lower member 38, an upper, forwardly extending member 39, an upper, rearwardly extending member 40 and bracing members 41 and 42. Where the members 38 and 40 join, the two frames on each side of the assembly are joined by a transverse member 43. Where the members 39 and 40 meet, they are joined by a transverse member 44. The member 44 may rotate and has fixed on it a pair of lever plates 45, 45. Fixed to each of the lever plates 45 is a pair of forwardly extending arms 46 and 47. These members are secured at their forward or outer ends to bearing plates 48, between which a bucket or shovel 49 is pivoted, as at 50. Transverse diagonal bracing members 51', 51' are secured between the arms 47 and stiffen and strengthen the structure.

Figure 1:
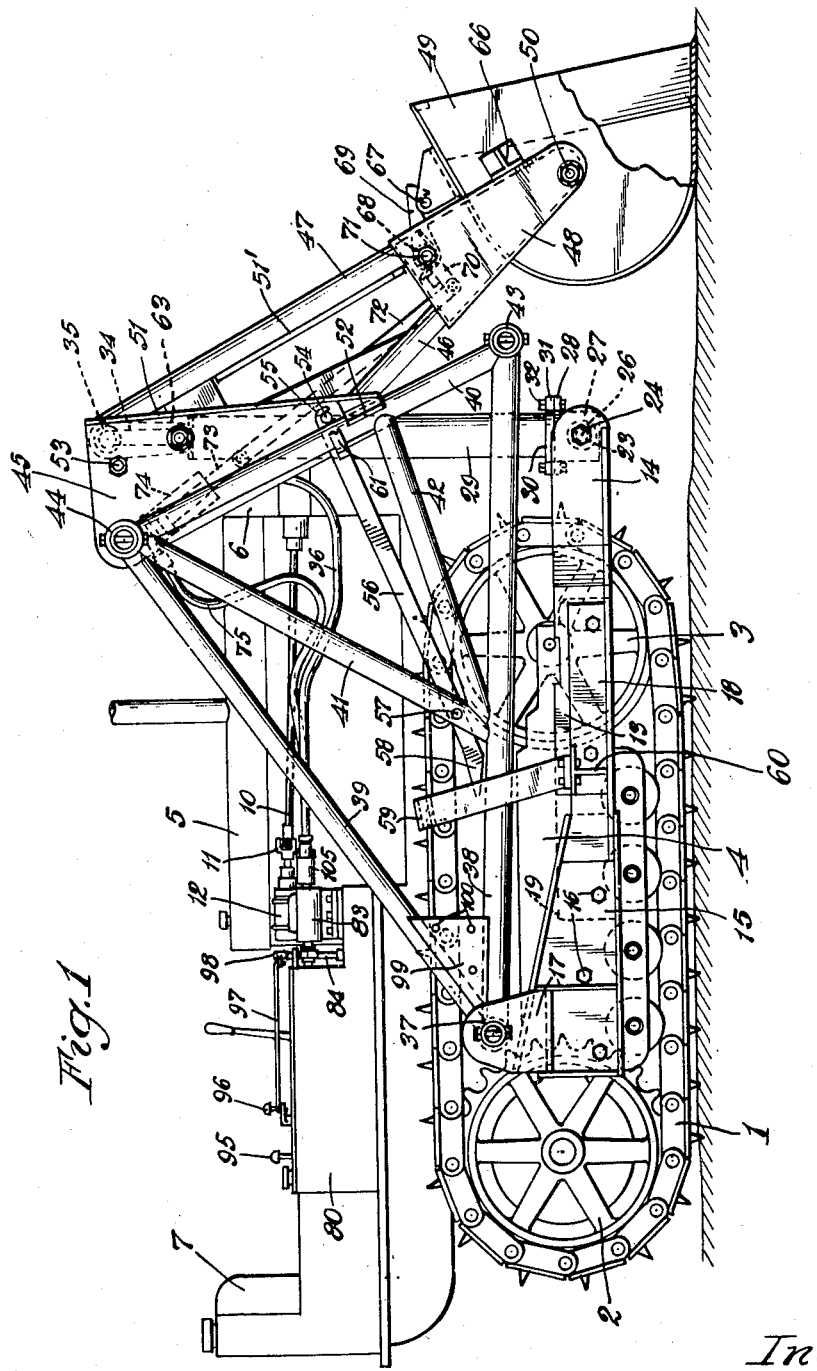
Figure 1 is a side elevation of the device in position on a tractor of standard design.
Figure 2:
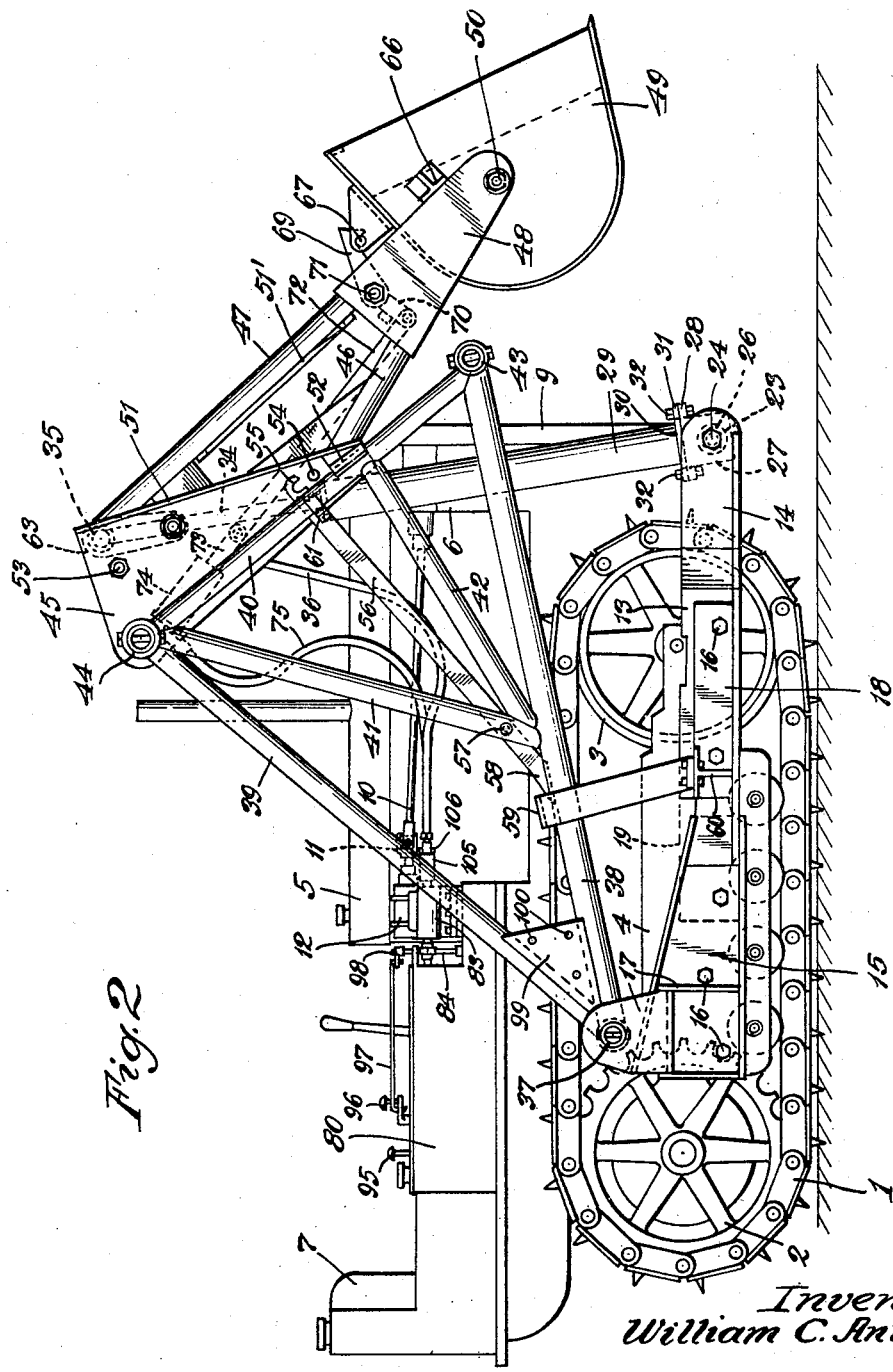
Figure 2 is a side elevation similar to Figure 1, but showing the shovel partially elevated.

The members 45 may be of any suitable shape. As shown, they are of angular cross section and are provided with flanges 51 along their upper edges. When the shovel is in the full lowered position, as shown in Figure 1, the various bucket supporting members just described are in folded position. In that position the stops 52, which are mounted on the plates 45 and which may be in contact with the flanges 51, rest upon the members 40 and thus give added support to the bucket or shovel, and in digging or loading take some of the load off the bearing formed by the member 44.

A tie rod 53 may join the members 45 to stiffen and strengthen the structure. Latch pins 54 are secured upon the plates 45. These are engaged when the shovel is in the downward position, as shown in Figure 1, by the hook portions 55 of latch bars 56. One such latch bar is pivoted on each of the members 41 at 57. The latch bars are provided with ends 58 which project under stirrup-like members 59. These members are fixed to abutments 60 which are carried on the frame members 18, as shown in Figures 1, 2, 4 and 6 particularly. The stirrup members 59 also straddle or overlie the side members 38 of the bucket frame structure. The latch members 56 may carry guiding rings 61 which overlie the members 40 and keep the latch members 56 in proper alignment. Hooks 62 are pivoted one on each of the cylinders 29 for a purpose which will be described below.

The member 35, which is attached to the pistons, is connected to the members 45 through pivoted links 63. If desired, frame members 64 with rearwardly directed parts 64' may be secured to the tractor. Socket members or depressions 65 may be formed in the members 64'. The use of these members will be described below.

As pointed out above, the bucket 49 is pivoted to the members 48 and 50. Stops 66 are mounted on the exterior of the bucket and when the bucket is in the untipped position, the stops as shown generally in Figures 1, 2 and 3 contact the upper portion of the members 48 and limit the counter-clockwise movement of the bucket. The bucket is preferably provided with one or more latches 67. The latching means in the particular form here shown includes a tubular member 68 carrying at each end latch hooks 69—one to engage with each of the latches 67, provided more than one of such latches is applied.

A lever arm 70 is fixed to the tube 68 which may be supported on a rod 71 for rotation. A link 72 is joined at one end to the arm 70 and at the other to a piston rod 73 which is mounted in a housing 74 fixed on one of the members 45. Pressure fluid is conducted to the cylinder 74 by means of a flexible conduit 75. As shown in Figure 8, a piston 76 is mounted on the piston rod 73 within the cylinder 74. Also mounted within the cylinder 74 is a compression spring 77 which is biased to move the piston so as to carry the piston rod into the cylinder. By suitable controls which will be described below, the piston may be actuated to move the piston rod 73 out of the cylinder, to rotate the tube 68 and to move the latch hooks 69 out of engagement with the latches 67 to unlatch the bucket or shovel and to permit it to tip from the full line position of Figure 3 to the dotted line position of that figure to discharge its contents. As indicated diagrammatically in Figure 3, the bucket in the dotted line position is discharging its contents into the body 78 of a truck which is carried on wheels 79. The bucket can, of course, be made to discharge its contents to any point desired and into any receptacle over which it can be moved.

The hydraulic mechanism by means of which the bucket assembly is raised and lowered and by means of which the bucket is unlatched for tipping will not be described. It includes a sump or oil reservoir 80 mounted on the tractor. The pump 12, also mounted on the tractor, is connected to it by a pipe 81. The pipe 82 leads from the pump and is in communication through a by-pass 81a and a ball check valve 81b with a return pipe 81c. The pipe 82 is in communication with a valve housing 83. A control valve is adjustably mounted within the housing on a rod 84, which referably projects at one end out of the housing 83. Two valve portions 85 and 86 are fixed to the rod 84. A conduit 87 leads from the housing 83 and is connected to the flexible conduit 36. A return flow branch 87a connects the conduit 87 to the housing 83 at a different point. A conduit or pipe 88 is connected to a second control housing 89 to which the flexible conduit 75, above mentioned, is also connected. This conduit 75 leads to the latch-controlling cylinder 74. A rod 90 is mounted in the housing 89 and carries valve portions 91 and 92. The housing 89 is also connected to the sump by a conduit 93.

Manual controls for the hydraulic system of Figure 8 appear throughout the figures. A handle 95 controls the rod 90 and may move it to effect the unlatching, when desired. A lever 96 controls the raising and lowering operation of the shovel assembly and is connected through a link 97 to a lever 98 which is connected to the valve rod 84.

Between the members 38 and 39 on each side of the assembly are mounted plates 99 provided with a plurality of perforations 100. These plates are used when it is desired to remove the shovel assembly from the tractor or to place it on the tractor. The commencement of this operation is shown in Figure 1. The shovel is lowered to the ground or it may be lowered until it rests upon a block or support 101. With the shovel in this position the latching levers 56 are moved manually to disengage them from the latch parts 54 and the tractor is moved rearwardly.

Figure 5:
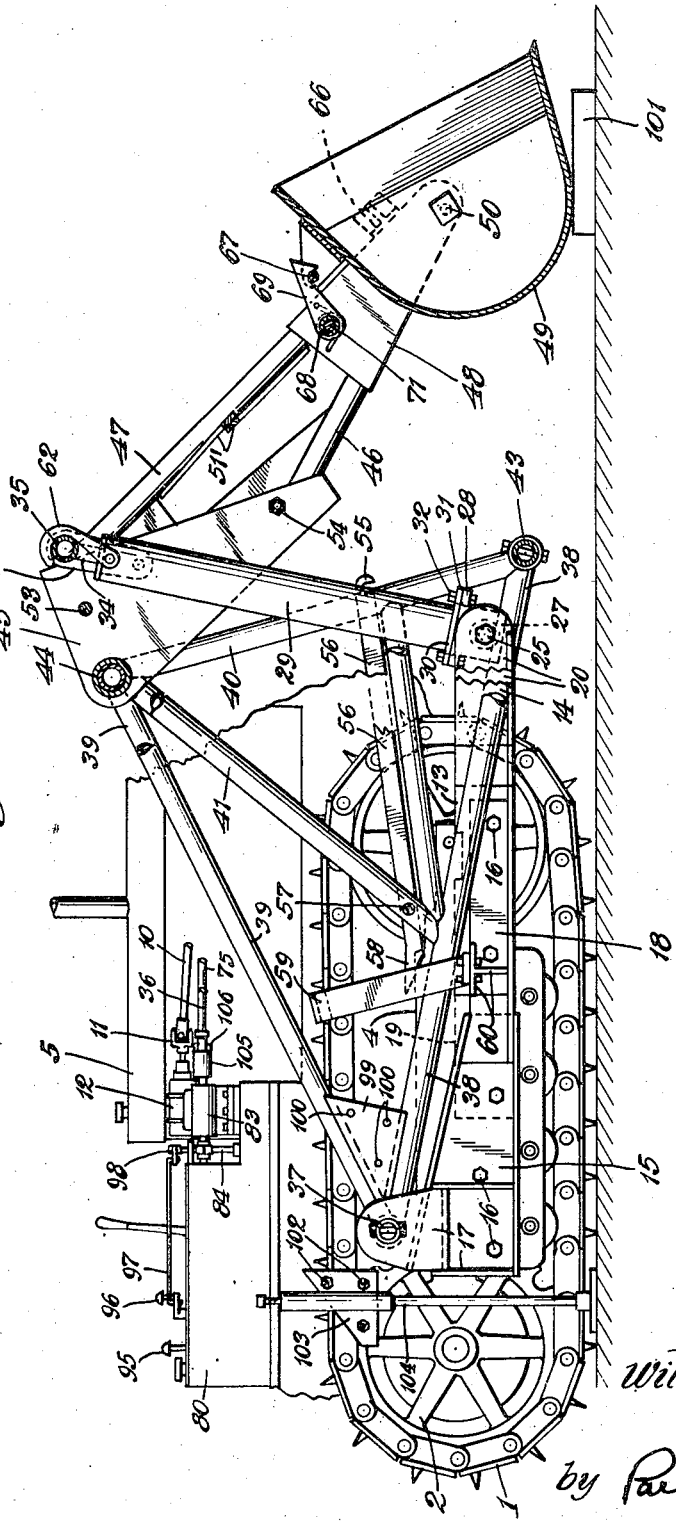
Figure 5 is a side elevation illustrating the shovel partially raised for removal from the tractor.

Since the bucket rests on the ground, the bucket raising mechanism is partly unfolded, for example, from the position of Figure 1 to the position of Figure 5. When this occurs, the transverse member 35 is brought low enough to be engaged by the hooks 62 which are manually moved into the engaging position shown in Figure 5. Either before or after this operation the bucket assembly is moved so that the frame member 38 is generally horizontal and the perforations 100 are brought into register with corresponding perforations 102 of the plate 103 on the jack 104. Bolts, pins or screws are then put into place in the two sets of perforations. If necessary, the jack or support 104 is raised so that it relieves the pressure on the member 37. Thus the pressure at the rear of the assembly is then carried on the jacks or supports 104, and the bearing member 37 may be removed. At the same time, the load and pressure at the forward end are carried on the block 101 or on the ground and the screws 24 and 25 may be removed. Thus the entire shovel assembly, except for the subframe which remains bolted to the tractor frame, is carried upon the ground or the block 101 and upon the jacks or supports 104. The bolts 32 are now loosened. It is necessary now only to remove the stirrups 59 and the entire assembly is thus disconnected from the tractor, which may be driven rearwardly until it is free of the shovel assembly. Sliding connections 105 and 106 in the pressure lanes 36 and 75 and in the power take-off drive permit this operation. When the shovel assembly is to be replaced in the tractor, the tractor is driven between the shovel side frames, the screws 24 and 25 and the bearing parts 37 are replaced and the shovel assembly is then again engaged to the tractor. The jacks or supports 104 are removed, the latch hooks 62 are swung downwardly, the tractor is driven forwardly and the hoist mechanism folds up until the latch hooks 55 engage the studs or latch members 54 and the entire assembly is then returned to the position of Figure 1.

Although I have shown an operative form of my invention, it will be recognized that many changes in the form, shape and arrangement of parts can be made without departing from the spirit of the invention, and my showing is therefore to be taken as, in a sense, diagrammatic.

The use and operation of this invention are as follows:

With the shovel assembly mounted on the tractor as shown in the figures generally, the shovel is lowered close to the ground. It is usually held slightly above the ground and the parts are generally such that when it is in the full lowered position of Figure 1, the shovel is just clear of the ground. In that position it is moved into contact with material which is to be picked up. This may be loose material, such as a pile of stone, coal or other material, or it may be a bank of earth or other compacted material.

The tractor is driven with sufficient force to force the material into the shovel. When the shovel is full it is raised to a height sufficient to bring its top more or less horizontal so that the load will be retained.

When the parts are in the position of Figure 1, the latch hooks 55 of the latch arms 56 engage the latch parts 54 on the lever members 45. At the start of the raising movement this relationship remains undisturbed. When the raising has been continued approximately to the position of Figure 2, the ends 58 of the latch bars 56 contact the stirrups 59 and the latch bars are tilted to the position of Figure 2, out of engagement with the members 54.

The assembly which includes the parts 46, 47 and 48 is thus free for pivotal movement. Just after the unlatching has taken place, the frame members 38 contact the stirrups 59 and further upward movement of the triangular frame is stopped. However, since the assembly including the members 46, 47 and 48 is now unlatched, further movement of the pistons 33 and the piston rods 34 permits pivoting of the lever plates 45 about the centers 44 and the bucket continues to move upwardly, the stops 52 having moved out of contact with the members 40. Further upward movement of the bucket and the arms 46, 47 and the plate 48 is about the pivot point 44, and this upward movement is continued until the bucket has been raised to the desired height.

Figure 3:
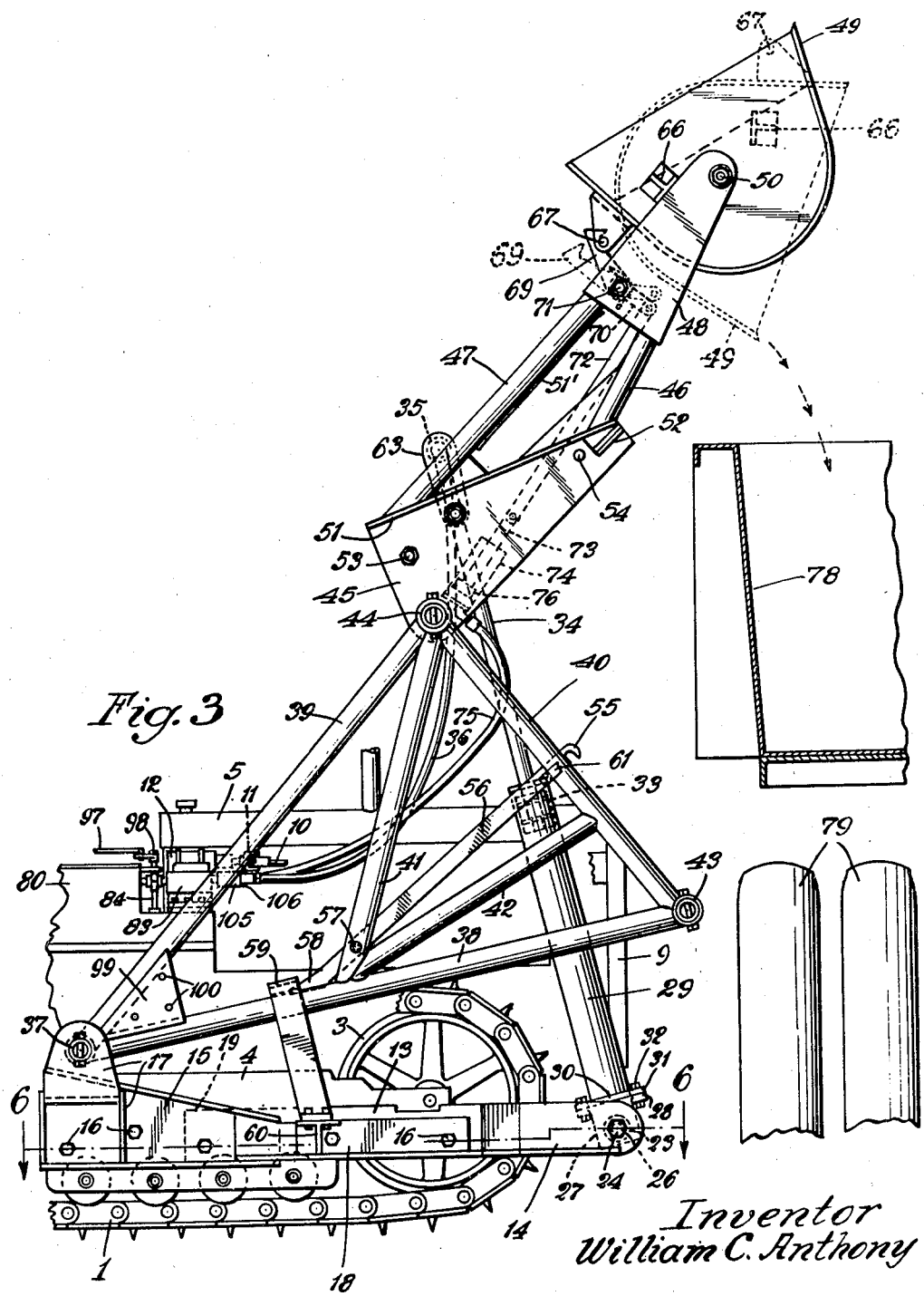
Figure 3 is a fragmentary side elevation showing the shovel elevated to the maximum point of lift and indicating the shovel in tipped position in dotted lines.
Figure 7:
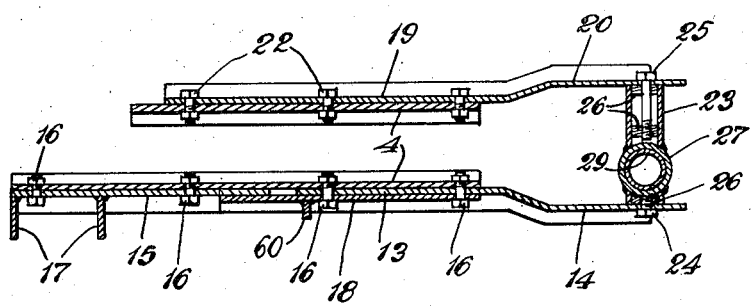
Figure 7 is a rear perspective view of a portion of the shovel assembly, showing the shovel enlarged at the commencement of tipping.
Figure 7:
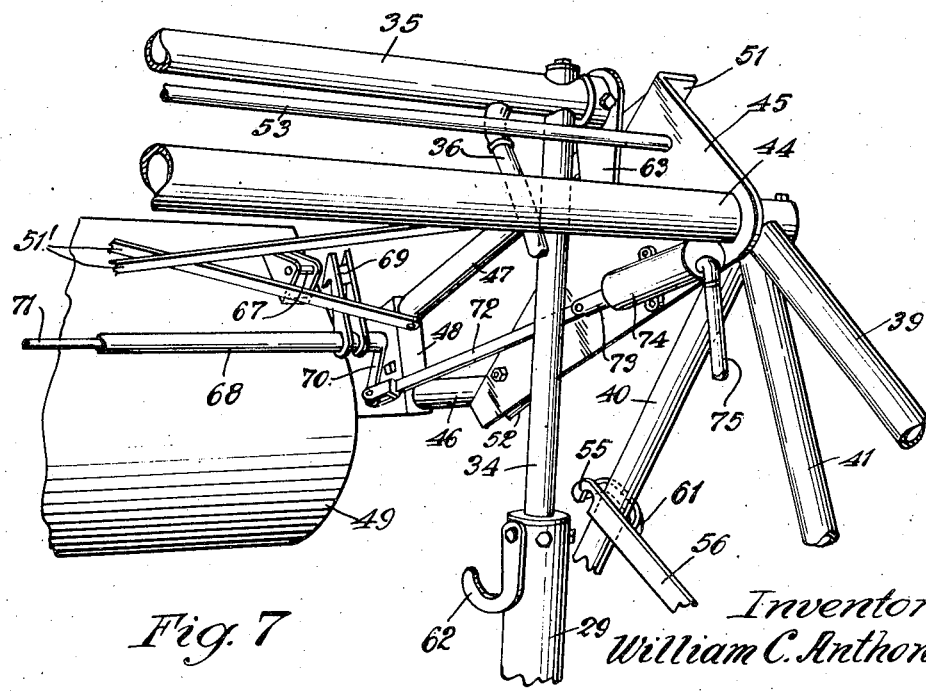

The tractor is then driven to a point where the load is to be deposited, for example, adjacent a truck, as shown in Figure 3, and the tractor is moved until the bucket overhangs the truck or other receptacle or the desired point of deposit. The controls which operate the latch member 68 and the latches 69 are moved to cause pressure fluid to force the piston 76 outwardly and through the linkage shown in Figure 7. This unlatches the latches 69 from the members 67 and the bucket is free to pivot from the full line position of Figure 3 to the dotted line position of that figure. The bucket is normally sufficiently out of balance or unsymmetrically supported so that it tends to tilt in the direction indicated in Figure 3.

When the bucket has been emptied, the tractor will ordinarily be backed away from the point of deposit and the hoisting controls are adjusted to by-pass pressure fluid away from the piston rods 34 and the pistons 33, and the bucket raising assembly is free to return to the downward position under the influence of gravity. Ordinarily the bucket assembly is lowered until the stops 52 are in contact with the members 40. However, the bucket may be stopped in any intermediate position, if desired.

The hydraulic control system of Figure 8 operates as follows. With the valves 85 and 86 in the position shown, and with the pump in operation, pressure fluid flows through conduit 82, through the housing 83 to conduit 87 and thence to flexible conduit 36 to the hollow member 35. Pressure fluid is thus supplied to the pistons 33 and the shovel structure is raised. The valves 91 and 92 will ordinarily not be in the position shown in Figure 8 during the raising movement of the bucket. However, whenever pressure is being exerted on the bucket raising system, pressure is effective through the pipe 88 and is available for operating the latch mechanism whenever the valves 91 and 92 are moved to the right position.

After the bucket has been raised to the desired position, the valves 85 and 86 are shifted by movement of the rod 84. They may be shifted upwardly to hold the bucket in the raised position. This is accomplished by raising the valves sufficiently for the valve 86 to close the pipe 87. The valve 85 will, in this position, also close the pipes 81c and 87a. In this position the bucket will be held in place and may be dumped if desired, or it may merely be held up while the tractor is driven to a point of discharge; then the bucket may be dumped. So long as there is pressure within the pipes 36 and 87, this pressure will be communicated through the pipe 88 to the housing 89 and may be directed through the pipe 75 to the cylinder 74 for operation of the power unlatching means. The movement of fluid to and from the pipe 75 is controlled by the position of the valves 91 or 92. While the bucket is being held in the raised position, the pump may continue to operate, and the pressure fluid will be bypassed through the check valve housing which contains the check valve 81b, and thence through the return pipe 81c to the tank 80.

When it is desired to lower the bucket, the valves 85 and 86 are raised further until the valve 85 clears the openings of the pipes 81c and 87a. In this position the valve 86 covers the opening to the pipe 87 and may also cover the opening to the pipe 82. Thus the weight of the boom and associated parts, including the bucket, are free to fall under the influence of gravity and to force liquid backward from the cylinders 29 as the pistons 33 return to the lower ends of the cylinders and the fluid is ejected from the cylinders and returned to or toward the tank 80.

It is to be understood that other hydraulic circuits might equally well be used to raise and lower the bucket and to control the latching and unlatching of the bucket. The mechanism shown in Figure 8 and described above is merely illustrative of one suitable hydraulic circuit and assembly. In the assembly shown, pressure is always available to the unlatching means whenever pressure is present in the lifting cylinders. In the position of the valves 91 and 92, as shown in Figure 8, pressure would be directed through the flexible conduit 75 to move the piston 76 in the unlatching direction. When this is not desired, the pistons are moved to close the conduit 88 and to open communication between the conduits 75 and 93. In this position the spring 77 is free to return the piston 76 to the latching position and it is sufficiently strong to overcome the very slight resistance of the oil. The unlatching mechanism, being independent of the position of the bucket, may be operated at any time when the pump is in motion, and the bucket may thus be unlatched whenever desired, irrespective of its position.

Although I have shown an operative form of my device, many changes in the form, shape and arrangement of parts may be made without departing from the spirit of the invention. The frame arrangement shown may be applied to tractors of any type, although it is particularly advantageous when applied to a crawler type tractor. The frame arrangement may also be applied to or used with raising means which are arranged to operate about a single fulcrum or pivot instead of the double fulcrum arrangement shown herewith.

I claim:

1. In combination in an elevating mechanism, members defining a two-part lever system, and means for raising said lever system, members defining a first fulcrum for said system and a second fulcrum for a part of said system, and means for causing raising movement about said second fulcrum, upon the completion of a predetermined amount of raising movement about said first fulcrum, and latch means effective to hold said lever system against relative movement, within itself, until the completion of said predetermined movement about said first fulcrum.

2. In combination in an elevating mechanism, members defining a two-part lever system, and means for raising said lever system, means for initially holding said two parts against relative movement, members, defining a first fulcrum for said system and a second fulcrum for a part of said system, means for freeing said two parts for relative movement, and means for causing raising movement about said second fulcrum, upon the completion of a predetermined amount of raising movement about said first fulcrum, and latch means effective to hold said lever system against relative movement, within itself, until the completion of said predetermined movement about said first fulcrum.

3. In combination in a shovel elevating assembly, a multi-part lever system, means for holding said parts initially against relative movement, a fulcrum for said lever system, and means for raising said lever system about said fulcrum, means for latching said parts against relative movement and means for freeing said parts for relative movement after a predetermined elevation has occurred, and means defining a second fulcrum for parts of said system whereby, upon the completion of an initial movement of the lever system, parts of the lever system are moved about said second fulcrum.

4. In combination in a shovel elevating assembly, a multi-part lever system, means for holding said parts initially against relative movement, a fulcrum for said lever system, and means for raising said lever system about said fulcrum for a predetermined distance, means for holding said parts against relative movement and means for freeing said parts for relative movement after a predetermined elevation has occurred, and means defining a second fulcrum for parts of said system whereby, upon the completion of an initial movement of said system, parts of the lever system are moved about said second fulcrum.

5. In combination in a shovel elevating assembly, a multi-part lever system, means for holding said parts initially against relative movement, a fulcrum for said lever system, and means for raising said lever system about said fulcrum for a predetermined distance, means for holding said parts against relative movement and means for freeing said parts for relative movement after a predetermined elevation has occurred, and means defining a second fulcrum for parts of said system whereby, upon the completion of an initial movement of the lever system, parts of the lever system are moved about said second fulcrum, while the remainder of said lever system remains stationary.

6. In combination, a shovel and means for supporting and raising it, comprising a base and a lever system, said system including a main member and a secondary member movably mounted on said main member, said shovel being movably mounted on said secondary member, a support providing a fulcrum for said main member, means for latching said main and secondary members together, and means for latching said shovel in position on said secondary member, means for raising said lever system about said fulcrum, whereby said shovel and said lever system move about the fulcrum of said main member, means for unlatching said main and secondary members, said raising means being effective, after said main member has stopped, to pivot said secondary member about its fulcrum on said main member, and means for unlatching said shovel.

7. In combination, a shovel and means for supporting and raising it, comprising a base and a lever system, said system including a main member and a secondary member movably mounted on said main member, said shovel being movably mounted on said secondary member, a support providing a fulcrum for said main member, means for latching said main and secondary members together, and means for latching said shovel in position on said secondary member, means for raising said lever system about said fulcrum, whereby said shovel and said lever system move about the fulcrum of said main member, means for unlatching said main and secondary members, and means for stopping the raising movement of said main member, said raising means being effective, after said main member has stopped, to pivot said secondary member about its fulcrum on said main member, and means for unlatching said shovel.

8. In combination, a shovel and means for raising it, said means including a two-part lever system, the two parts of said lever system being arranged for relative movement, power means for moving said lever system, a main fulcrum about which said lever system as a whole is moved, and a secondary fulcrum above said main fulcrum about which a portion only of said lever system is moved, and a positive limit for the movement of a portion of said lever system.

WILLIAM C. ANTHONY.

REFERENCES CITED

The following references are of record in the file of this patent:

UNITED STATES PATENTS

| Number | Name | Date |
| --- | --- | --- |
| 1,723,506 | Goodlin | Aug. 6, 1929 |
| 2,334,835 | Nix | Nov. 23, 1943 |
| 2,338,361 | Shin, Jr. | Jan. 4, 1944 |
| 2,349,335 | Baldwin | May 23, 1944 |
| 2,416,893 | Barker | March 4, 1947 |
| 2,418,299 | Gorsuch | April 1, 1947 |
| 2,427,968 | Hoover | Sept. 23, 1947 |